United States Patent
Shows et al.

(10) Patent No.: US 8,354,958 B2
(45) Date of Patent: Jan. 15, 2013

(54) ALIGNMENT SYSTEM

(75) Inventors: Gilbert M. Shows, Plano, TX (US); Jacob Kim, Dallas, TX (US)

(73) Assignee: Raytheon Company, Waltham, MA (US)

( * ) Notice: Subject to any disclaimer, the term of this patent is extended or adjusted under 35 U.S.C. 154(b) by 38 days.

(21) Appl. No.: 12/951,359

(22) Filed: Nov. 22, 2010

(65) Prior Publication Data

US 2012/0127033 A1    May 24, 2012

(51) Int. Cl.
*H01Q 3/00* (2006.01)
(52) U.S. Cl. .......................................... 342/359
(58) Field of Classification Search ............... 342/154, 342/354, 359, 369, 372; 343/754, 757
See application file for complete search history.

(56) References Cited

U.S. PATENT DOCUMENTS

| | | | |
|---|---|---|---|
| 4,243,993 A | 1/1981 | Lamberty et al. | |
| 4,481,000 A | 11/1984 | Mohon | |
| 5,473,331 A | 12/1995 | Kennedy et al. | |
| 5,980,254 A | 11/1999 | Muehle et al. | |
| 6,608,584 B1 | 8/2003 | Faulkner | |
| 6,842,138 B1 | 1/2005 | Wilkinson | |
| 7,773,202 B2 | 8/2010 | Crawford et al. | |
| 2009/0267852 A1 | 10/2009 | Tahmisian, Jr. et al. | |

OTHER PUBLICATIONS

Kolosowski et al.; Monopulse IFF Antennas; Microwaves, Radar and Wireless Communications; MIKON 17th International Conference; pp. 1-4; May 2008.

*Primary Examiner* — Dao Phan
(74) *Attorney, Agent, or Firm* — Pierce Atwood LLP; Joseph M. Maraia

(57) ABSTRACT

An apparatus for determining alignment of a first subsystem relative to a second subsystem. The apparatus includes a first antenna system for simultaneously transmitting a delta pattern radiation beam at a first frequency and a sum pattern radiation beam at a second frequency. The apparatus also includes a second antenna system for receiving the delta pattern radiation beam at the first frequency and the sum pattern radiation beam at the second frequency. The apparatus also includes a processor to process the received delta pattern radiation beam and sum pattern radiation beam to determine if a predetermined alignment criterion between the first antenna system and the second antenna system is satisfied.

16 Claims, 5 Drawing Sheets

ALIGNMENT SYSTEM

FIELD OF THE INVENTION

The currently described invention relates to systems and methods for determining alignment of a first subsystem relative to a second subsystem.

BACKGROUND

Existing alignment and targeting systems cannot appropriately engage targets that are obscured by dust, smoke, fog, brush, fabric, and other forms of cover. Many of these systems use an eye safe laser which is not capable of penetrating the obscurants. Alternative solutions replace the laser with location tracking and orientation sensors to determine if two systems are aligned. However, this solution has the disadvantage of not being able to dynamically sense if the line of sight between the systems is obscured. The approach requires highly accurate and detailed terrain data maps be used to enable realistic obscured line-of-sight engagements while preventing unrealistic ones. Anything that is not accurately depicted in the terrain data such as rocks, trees, sandbags, and vehicles will result in unrealistic engagements. The use of highly accurate terrain data, system orientation, and location information are major contributing factors to the complexity of this approach.

A need therefore exists for improved systems and methods for determining alignment of a first subsystem relative to a second subsystem.

SUMMARY

Embodiments herein leverage monopulse direction finding techniques to determine alignment of a first subsystem relative to a second subsystem. The first subsystem uses a transmit antenna that develops two antenna beams referred to as sum and delta beams. The sum beam is abroad uniform beam centered axially along an orientation axis of the first subsystem (e.g., a weapon orientation axis). The delta beam is also abroad uniform beam but it has a null that is centered axially along the orientation axis of the first subsystem. The second subsystem uses a single broad antenna beam to detect the transmitted antenna beams. The orientation of the first subsystem relative to the second subsystem is determined by comparing the amplitudes of the received sum and delta beams. The first subsystem transmits using different channels on the sum and delta beams. Because two channels are used, the second subsystem is able to detect each channel and make an amplitude comparison of the received sum and delta beams.

Another embodiment is a system for determining alignment of a first subsystem relative to a second subsystem. The system includes a first antenna system for simultaneously transmitting a delta pattern radiation beam at a first frequency and a sum pattern radiation beam at a second frequency. The system also includes a second antenna system for receiving the delta pattern radiation beam at the first frequency and the sum pattern radiation beam at the second frequency. The system also includes a processor to process the received delta pattern radiation beam and sum pattern radiation beam to determine if a predetermined alignment criterion between the first antenna system and the second antenna system is satisfied.

In some embodiments, the first antenna system includes a four arm helix antenna to transmit both the delta pattern radiation beam at the first frequency and the sum pattern radiation beam at the second frequency. In some embodiments, the first antenna system is a multi-arm planar antenna system, conical spiral antenna system, multi-radial strip antenna system, multi-radial slot antenna system, slotted flat plate antenna system, or an array antenna.

In some embodiments, the sum pattern radiation beam peak is centered axially along a desired orientation axis of a first subsystem coupled to the first antenna system. In some embodiments, the delta pattern radiation beam null is centered axially along a desired orientation axis of a first subsystem coupled to the first antenna system.

In some embodiments, the processor determines whether the predetermined alignment criterion is satisfied based on the amplitudes of the received delta pattern radiation beam at the first frequency and the sum pattern radiation beam at the second frequency. In some embodiments, the first antenna system is coupled to a transmitting body and the second antenna system is coupled to a receiving body. The transmitting body can be a firearm and the receiving body can be a user.

In some embodiments, the first antenna system transmits and the second antenna system receives linearly polarized beams, wherein the beams have the same polarization. In some embodiments, the first antenna system transmits a circularly polarized beam and the second subsystem receives linearly or circularly polarized beams.

Another embodiment is a method for determining alignment of a first subsystem relative to a second subsystem. The method includes simultaneously transmitting, with a first antenna system, a delta pattern radiation beam from a first antenna system at a first frequency and a sum pattern radiation beam at a second frequency. The method also includes receiving, with a second antenna system, the delta pattern radiation beam at the first frequency and the sum pattern radiation beam at the second frequency. The method also includes processing the received delta pattern radiation beam and sum pattern radiation beam to determine if a predetermined alignment criterion between the first antenna system and the second antenna system is satisfied.

In some embodiments, the sum pattern radiation beam peak is centered axially along a desired orientation axis of a first subsystem coupled to the first antenna system. In some embodiments, the delta pattern radiation beam null is centered axially along a desired orientation axis of a first subsystem coupled to the first antenna system. In some embodiments, the second antenna system is an omni-directional or broad beam antenna oriented in the direction of the first antenna system.

In some embodiments, the method includes determining whether the predetermined alignment criterion is satisfied based on the relative amplitudes of the received delta pattern radiation beam at the first frequency and the sum pattern radiation beam at the second frequency. In some embodiments, the predetermined alignment criterion is determined to be satisfied based if the amplitude of the received sum pattern radiation beam at the first frequency is determined to be greater than the amplitude of the delta pattern radiation beam at the second frequency by a predetermined threshold.

In some embodiments, the method includes transmitting, from a transmitting body coupled to the first antenna system, the delta pattern radiation beam at the first frequency and the sum pattern radiation beam at the second frequency, and receiving, at the second antenna system coupled to a receiving body, the delta pattern radiation beam and the sum pattern radiation beam.

Other aspects and advantages of the current invention will become apparent from the following detailed description, taken in conjunction with the accompanying drawings, illustrating the principles of the invention by way of example only.

BRIEF DESCRIPTION OF THE DRAWINGS

The foregoing features of various embodiments of the invention will be more readily understood by reference to the following detailed descriptions in the accompanying drawings, in which.

DETAILED DESCRIPTION OF ILLUSTRATIVE EMBODIMENTS

Figure 1:
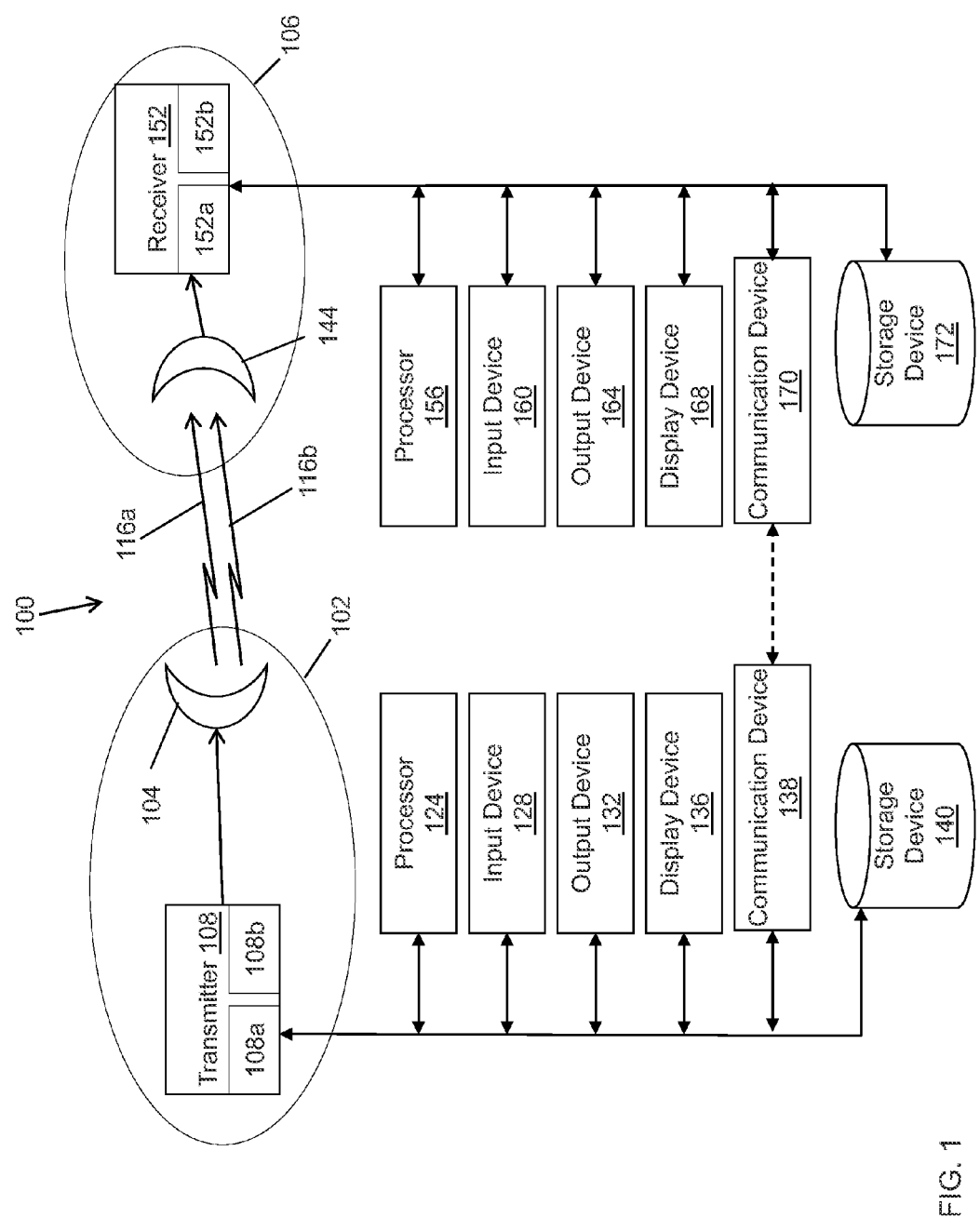
FIG. 1 is a schematic illustration of an apparatus for determining alignment of a first subsystem relative to a second subsystem.

FIG. 1 is a schematic illustration of an apparatus 100 for determining alignment of a first subsystem relative to a second subsystem. The apparatus 100 includes a first antenna system 102 and a second antenna system 106. The system 100 includes a processor 124 electrically coupled to a first transmitter 108a and a second transmitter 108b (generally 108) of the first antenna system 102. The processor 124 can be, for example, a radio transmitter processor or other suitable computer processor used in antenna systems. The transmitters 108a and 108b are coupled to a first antenna 104. The processor 124 provides transmission signals to the transmitters 108a and 108b which are transmitted by the first antenna 104 as radiation beams 116a and 116b, respectively (generally 116). In one embodiment, radiation beam 116a is transmitted at a first frequency and radiation beam 116b is transmitted at a second, different frequency to enable the signals received by the receiving antenna to be used to distinguish between the two radiation beams.

The radiation beams 116a and 116b (e.g., delta pattern radiation beam and sum pattern radiation beam, respectively) are directed towards a second antenna system 106 to, for example, determine the alignment of the first antenna system 102 relative to the second antenna system 106. The second antenna 144 of the second antenna system 106 receives the radiation beams 116a and 116b. A first receiver 152a and second receiver 152b (generally 152) of the second antenna system 106 receive the radiation beams 116a and 116b, respectively, transmitted by the antenna 104. The first receiver 152a and second receiver 152b direct the received signals to the processor 156.

In one embodiment, the processor 156 determines the first antenna system 102 is aligned relative to the second antenna system 106 if a predetermined alignment criterion is satisfied based on the received radiation beams 116a and 116b. In one embodiment, the processor 156 determines whether the predetermined alignment criterion is satisfied based on the amplitudes of the received radiation beams 116a and 116b (e.g., based on the magnitude of the amplitudes of a received delta pattern radiation beam and a SUM pattern radiation beam transmitted by the first antenna 104).

In one exemplary embodiment, the processor 156 compares the magnitudes of the received delta pattern radiation beam to the received sum pattern radiation beam. In the exemplary embodiment, the processor 156 determines the first antenna system 102 is not aligned with the second antenna system 106 if the magnitude of the received sum pattern radiation beam is less than the magnitude of the received delta pattern radiation beam. The processor 156 determines the first antenna system 102 is partially aligned with the second antenna system 106 if the magnitude of the received sum pattern radiation beam is less than the magnitude of the received delta pattern radiation beam summed with a threshold value (e.g., 25 dB in signal strength). The processor 156 determines the first antenna system 102 is aligned with the second antenna system 106 if the magnitude of the received sum pattern radiation beam is greater than the magnitude of the received delta pattern radiation beam summed by a threshold value (e.g., 25 dB in signal strength).

Alternative alignment criterion can be used in alternative embodiments. For example, different threshold values can be used in alternative embodiments. In some embodiments, the threshold value can be varied depending on the distance between the first antenna system 102 and second antenna system 106 to simulate, for example, lower accuracy for short distances and higher accuracy for long distances.

In one alternative embodiment, the signal transmitted by the radiation beam 116a is the sum of the delta pattern radiation beam and the sum pattern radiation beam, and the signal transmitted by the radiation beam 116b is the difference between the sum pattern radiation beam and the delta pattern radiation beam (i.e., sum pattern radiation beam minus the delta pattern radiation beam). In this alternative embodiment, the processor determines that the first antenna system 102 is aligned with the second antenna system 106 if the magnitude of the received radiation signals 116a and 116b are equal (or, for example, have magnitudes within a predetermined amount (e.g., within 10 dB)).

In this embodiment, the antenna systems 102 and 106 are coupled to communication device 138 and 170, respectively. The communication device 138 is coupled (e.g., by an electrical or wireless connection) to the processor 124 and transmitter 108 of the first antenna system 102. The communication device 170 is coupled (e.g., by an electrical or wireless connection) to the processor 156 and receiver 152 of the first antenna system 106. The communication devices 138 and 170) communicate information to/from the respective antenna system (102 and 106). The communication device 170 associated with the second antenna system 106 can send information to the communication device 138 of the first antenna system 102 (e.g., information representative of whether the first antenna system 102 is aligned relative to the second antenna system 106).

The first antenna system 102 can be coupled to a transmitting body (e.g., firearm, weapon mounted to a vehicle). The second antenna system 106 can be coupled to a receiving body (e.g., user, vehicle, structure).

In one embodiment, the radiation beam 116a is a sum pattern radiation beam and the peak of the sum pattern radiation beam is centered axially along a desired orientation axis of a first subsystem coupled to the first antenna system 102. In one embodiment, the radiation beam 116b is a delta pattern radiation beam and the null of the delta pattern radiation beam is centered axially along a desired orientation of the first subsystem coupled to the first antenna system 102.

In some embodiments, the first antenna system 102 is a four arm helix an system that includes a four arm helix antenna (104). A four arm helix antenna transmits circularly polarized radiation beams. In embodiments where the first antenna system 102 transmits circularly polarized radiation beams, the second antenna system 106 can be, but is not required to be, circularly polarized.

In alternative embodiments, the first antenna system is a multi-arm planar antenna system, conical spiral antenna system, multi-radial strip antenna system, multi-radial slot antenna system, slotted flat plate antenna system, or an array system. In some embodiments, the first antenna system 102 and second antenna system 106 transmit linearly polarized radiation beams. In embodiments where the first and second antenna systems 102 and 106 transmit polarized radiation beams, the polarization of the beams is the same. In some embodiments, the second antenna system 106 is an omnidirectional antenna so orientation of, for example, a person holding the second antenna system 106 does not affect the system 100 determining alignment of the first antenna system 102 relative to the second antenna system 106.

The modules and devices described herein can, for example, utilize a processor (e.g., processor 124 or processor 156) to execute computer executable instructions and/or include a processor to execute computer executable instructions (e.g., an encryption processing unit, a field programmable gate array processing unit). It should be understood that the system 100 can include, for example, other modules, devices, and/or processors known in the art and/or varieties of the illustrated modules, devices, and/or processors.

The first antenna system 102 is optionally coupled (e.g., electrically or wirelessly) to an input device 128, an output device 132, a display device 136, and a storage device 140. The second antenna system 102 is optionally coupled to an input device 160, an output device 164, a display device 168, and a storage device 172.

The input devices (128 and 160) receive information associated with the system 100 (e.g., instructions from a user, instructions from another computing device) from a user (not shown) and/or another computing system (not shown). The input devices (128 and 160) can include, for example, a touch screen, keyboard, microphone or scanner. The output devices (132 and 164) output information associated with the system 100 (e.g., information to a printer (not shown), information to an audio speaker (not shown)).

The display devices (136 and 168) display information associated with the system 100 (e.g., status information, configuration information). The processors (124 and 156) execute the operating system and/or any other computer executable instructions for the system 100 (e.g., sends commands from the transmitter 108 to the first antenna 104).

The storage devices (140 and 172) store information associated with the system 100 and its operation. The storage devices (140 and 172) can store information and/or any other data associated with the system 100. The storage devices (140 and 172) can include a plurality of storage devices. The storage devices (140 and 172) can include, for example, long-term storage (e.g., a hard drive, a tape storage device, flash memory), short-term storage (e.g., a random access memory, a graphics memory), and/or any other type of computer readable storage. In some embodiments, the input device, output device, display device, storage device, and processor are components of a handheld personal digital assistant (PDA).

Figure 2:
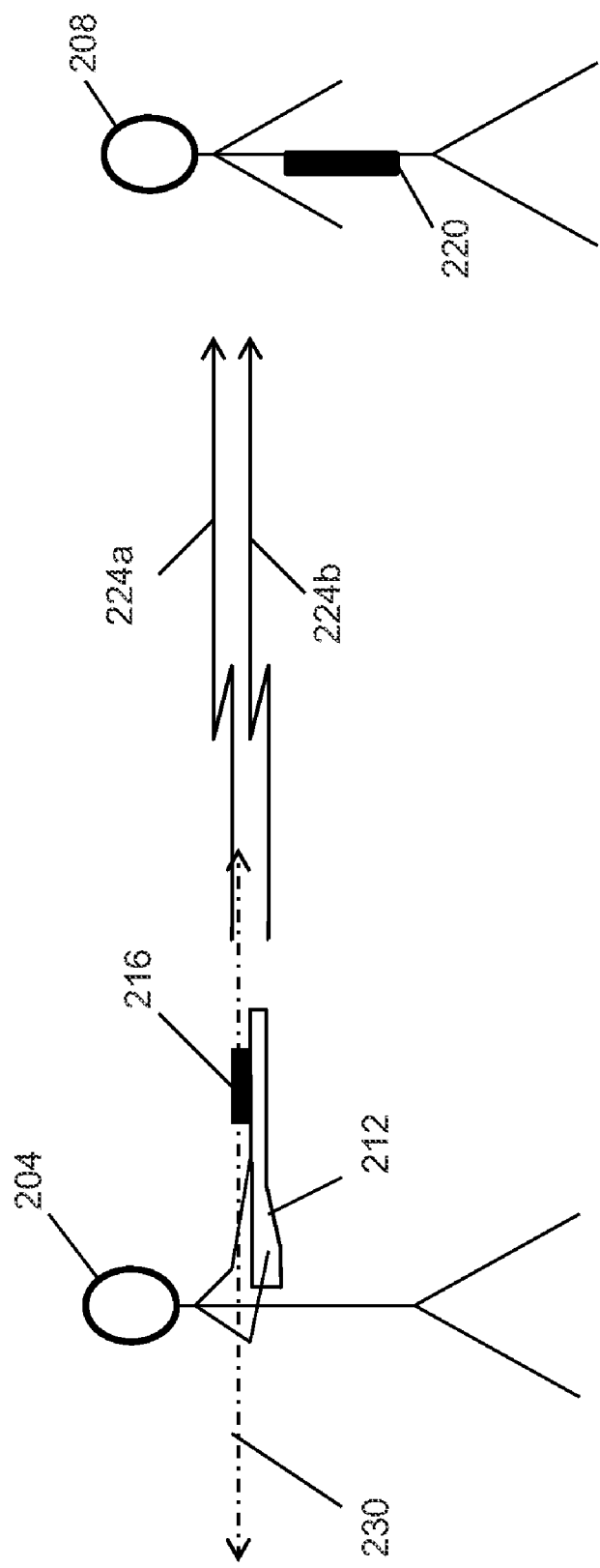
FIG. 2 is a schematic illustration of an embodiment for determining alignment of a first subsystem relative to a second subsystem.

FIG. 2 is a schematic illustration of an embodiment for determining alignment of a first subsystem relative to a second subsystem used as, for example, a training system that provides a realistic battlefield environment for soldiers involved in training exercises without requiring live ammunition. The illustration includes a first user 204 and a second user 108. The first user 204 is holding a rifle 212. A first antenna system 216 (e.g., first antenna system 102 of FIG. 1) is coupled (e.g., mounted, bonded, fastened) to the rifle 212. The first antenna system 216 is axially aligned along an orientation axis 230 (e.g., longitudinal axis) of the rifle 212. A second antenna system 220 (e.g., the second antenna system 106 of FIG. 1) is coupled to the second user 208.

In operation, the first user 204 points the rifle 212 at the second user 208. The user pulls a trigger (e.g., input device) on the rifle 212 to cause a processor (e.g., processor 124) to provides transmission signals to transmitters associated with the first antenna system 216 (e.g., transmitters 108a and 108b of FIG. 1). The transmission signals are transmitted by a first antenna (antenna 104 of FIG. 1) of the first antenna system 216 as radiation beams 224a and 224b. In this embodiment, the radiation beams 224a and 224b are a delta pattern radiation beam and a sum pattern radiation beam, respectively. The sum pattern radiation beam peak of the radiation beam 224a is centered axially along, the orientation axis 230 of the first antenna system 216 and rifle 212. The delta pattern radiation beam null of the radiation beam 224b is centered axially along the orientation axis 230 of the first antenna system and rifle 212.

An antenna (e.g., antenna 144 of FIG. 1) of the second antenna system 220 receives the radiation beams 116a and 116b. A first receiver and second receiver (e.g., receivers 152a and 152b FIG. 1) of the second antenna system 220 receive the radiation beams 116a and 116b. The first receiver and second receiver direct the received signals to a processor (e.g., processor 156 of FIG. 1) to process the received signals to determine whether the first antenna system 216 is aligned with the second antenna system 220.

In some embodiments, it is desirable to reduce the size of the antennas in the system to be as small as possible while retaining the necessary transmission characteristics. In one embodiment, with respect to FIG. 2, the transmitting antenna of the first antenna system 216 is designed to be mounted on the exterior of a weapon system (e.g., an M4). In one embodiment, the transmitting antenna is a helix antenna that has a cylindrical body that is less than 2 inches (50.8 mm) in diameter and 6 inches (152.4 mm) long. The gain and beamwidth of the helix antenna is a function of the number of turns and length of the helix. Tradeoffs can be made between performance and size of the antenna.

The receiving antenna is used for receiving purposes only and, is often selected with as broad a beamwidth as possible. Breadth of the beamwidth is typically traded off with antenna size so that it can be mounted on a vest or harness worn by a user (e.g., a soldier being trained). In one embodiment, the receiving antenna has a square form factor with dimensions less than 2 inches (50.8 mm) by 2 inches (50.8 mm) and a thickness of 1 inch (25.4 mm).

In one embodiment, the transmitters (e.g., transmitters 108a and 108b of FIG. 1) and receivers (e.g., receivers 152a and 152b of FIG. 1) use digital radio modules. Each antenna has two radio modules connected to it. The radio modules operate on two different radio frequency channels to transmit or receive the two differently shaped radiowave beams.

Figure 3:
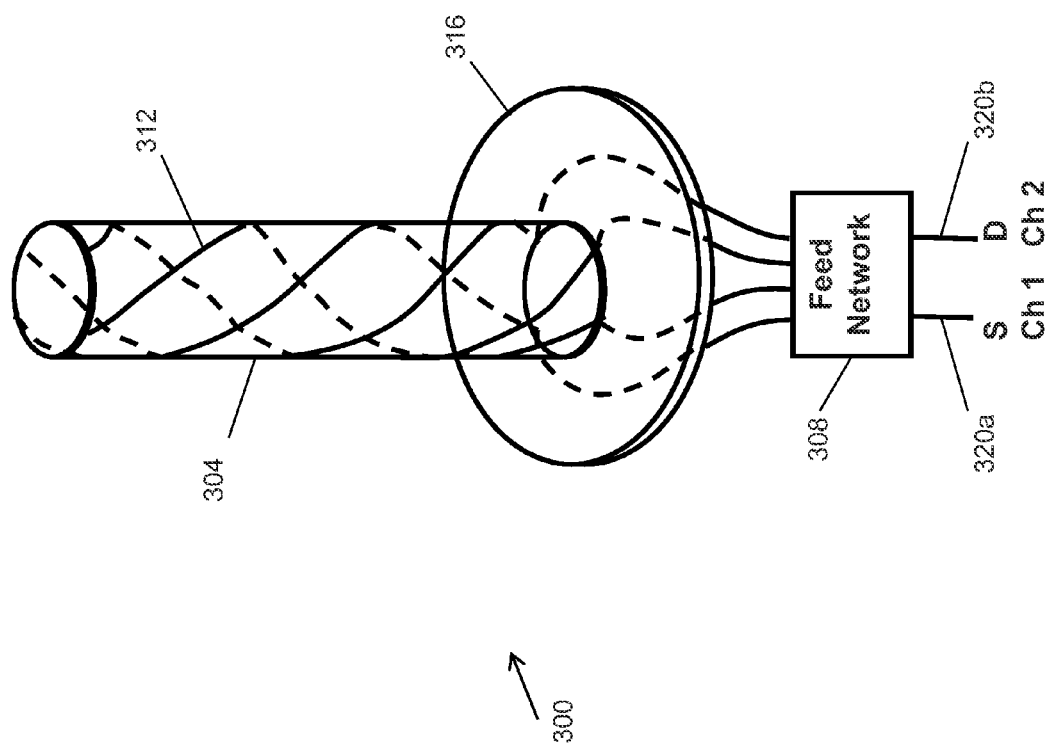
FIG. 3 is a schematic illustration of an exemplary antenna used in determining alignment of a first subsystem relative to a second subsystem.

FIG. 3 is a schematic illustration of an exemplary antenna 300 used in determining alignment of a first subsystem relative to a second subsystem. The antenna 300 is a four arm helix antenna that includes a four element axial mode helix antenna 304 and a feed network 308. The helix antenna 304 includes a conducting wire wound in the form of a helix 312. The helix antenna 304 is mounted over a ground plane 316.

The feed network 308 includes a 90 degree coupler and a 180 degree coupler. The antenna 300 includes two inputs 320a and 320b. The inputs 320a and 320b receive transmission signals (e.g., a delta pattern transmission signal and a sum pattern transmission signal) from transmitters (e.g., transmitters 108a and 108b of FIG. 1). The antenna 300 transmits radiation beams, for example, a delta pattern radiation beam and a sum pattern radiation beam (e.g., delta pattern radiation beam 224a and sum pattern radiation beam 224b of FIG. 2) in response to receiving the transmission signals.

Figure 4:
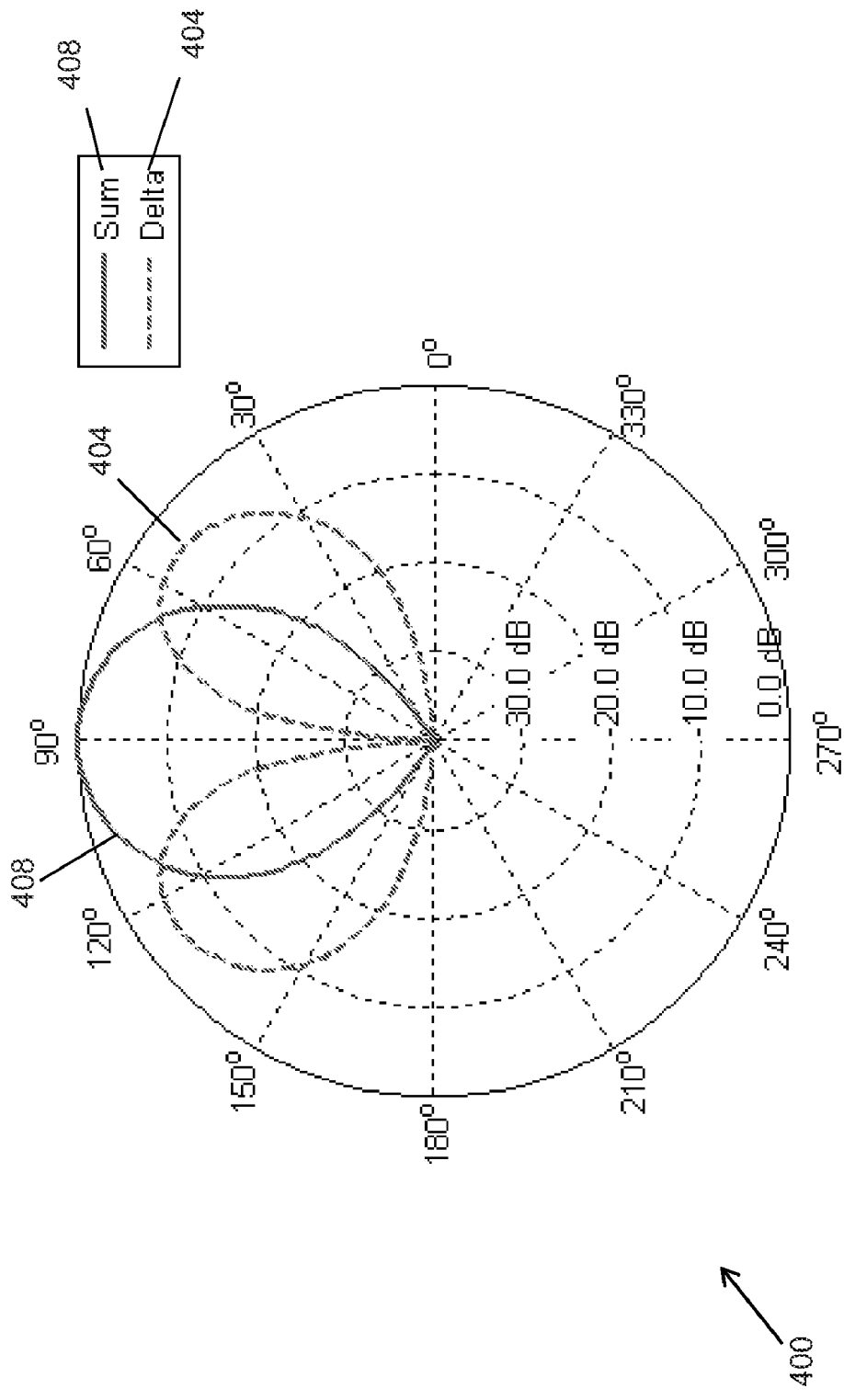
FIG. 4 is a graphical representation of exemplary antenna radiation signals for a delta pattern radiation beam and a sum pattern radiation beam of an apparatus for determining alignment of a first subsystem relative to a second subsystem.

FIG. 4 is a graphical representation of a polar coordinate plot 400 of exemplary antenna radiation signals for a delta pattern radiation beam 404 and a sum pattern radiation beam 408 of an apparatus for determining alignment of a first subsystem relative to a second subsystem (e.g., the first antenna system 102 and second antenna system 106 of FIG. 1, or the first antenna system 216 and second antenna system 220 of FIG. 2). The magnitude of the delta pattern radiation beam 404 is approximately 5 dB less than the magnitude of the sum pattern radiation beam 408.

Figure 5:
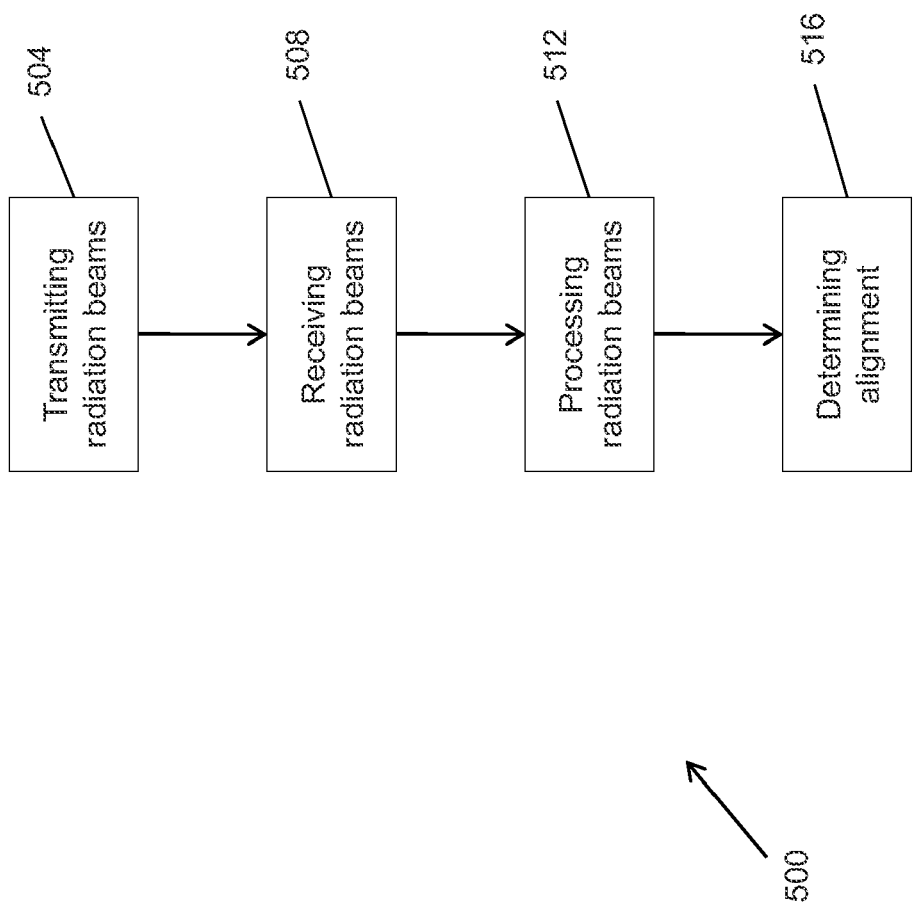
FIG. 5 is a flowchart of a method for determining alignment of a first subsystem relative to a second subsystem.

FIG. 5 is a flowchart of an exemplary method 500 for determining alignment of a first subsystem relative to a second subsystem (e.g., the first antenna system 102 relative to the second antenna system 106 of FIG. 1). The method 500 includes simultaneously transmitting 504, with the first antenna system, a delta pattern radiation beam at a first frequency and a sum pattern radiation beam at a second frequency. The method 500 also includes receiving 508, with the second antenna system, the delta pattern radiation beam at the first frequency and the sum pattern radiation beam at the second frequency. The method 500 also includes processing 512 the received delta pattern radiation beam and sum pattern radiation beam to determine if a predetermined alignment criterion between the first antenna system and the second antenna system is satisfied. The method 500 also includes determining whether the predetermined alignment criterion is satisfied based on the amplitudes of the received delta pattern radiation beam at the first frequency and the sum pattern radiation beam at the second frequency, for example, similarly as described previously herein.

The above-described systems and methods can be implemented in digital electronic circuitry, in computer hardware, firmware, and/or software. The implementation can be as a computer program product (i.e., a computer program tangibly embodied in an information carrier). The implementation can, for example, be in a machine-readable storage device and/or in a propagated signal, for execution by, or to control the operation of, data processing apparatus. The implementation can, for example, be a programmable processor, a computer, and/or multiple computers.

A computer program can be written in any form of programming language, including compiled and/or interpreted languages, and the computer program can be deployed in any form, including as a stand-alone program or as a subroutine, element, and/or other unit suitable for use in a computing environment. A computer program can be deployed to be executed on one computer or on multiple computers at one site.

Method steps can be performed by one or more programmable processors executing a computer program to perform functions of the invention by operating on input data and generating output. Method steps can also be performed by and an apparatus can be implemented as special purpose logic circuitry. The circuitry can, for example, be a FPGA (field programmable gate array) and/or an ASIC (application-specific integrated circuit). Modules, subroutines, and software agents can refer to portions of the computer program, the processor, the special circuitry, software, and/or hardware that implements that functionality.

Processors suitable for the execution of a computer program include, by way of example, both general and special purpose microprocessors, and any one or more processors of any kind of digital computer. Generally, a processor receives instructions and data from a read-only memory or a random access memory or both. The essential elements of a computer are a processor for executing instructions and one or more memory devices for storing instructions and data. Generally, a computer can include, can be operatively coupled to receive data from and/or transfer data to one or more mass storage devices for storing data (e.g., magnetic, magneto-optical disks, or optical disks).

Data transmission and instructions can also occur over a communications network. Information carriers suitable for embodying computer program instructions and data include all forms of non-volatile memory, including by way of example semiconductor memory devices. The information carriers can, for example, be EPROM, EEPROM, flash memory devices, magnetic disks, internal hard disks, removable disks, magneto-optical disks, CD-ROM, and/or DVD-ROM disks. The processor and the memory can be supplemented by, and/or incorporated in special purpose logic circuitry.

To provide for interaction with a user, the above described techniques can be implemented on a computer having a display device. The display device can, for example, be a cathode ray tube (CRT) and/or a liquid crystal display (LCD) monitor. The interaction with a user can, for example, be a display of information to the user and a keyboard and a pointing device (e.g., a mouse or a trackball) by which the user can provide input to the computer (e.g., interact with a user interface element). Other kinds of devices can be used to provide for interaction with a user. Other devices can, for example, be feedback provided to the user in any form of sensory feedback (e.g., visual feedback, auditory feedback, or tactile feedback). Input from the user can, for example, be received in any form, including acoustic, speech, and/or tactile input.

The above described techniques can be implemented in a distributed computing system that includes a back-end component. The back-end component can, for example, be a data server, a middleware component, and/or an application server. The above described techniques can be implemented in a distributing computing system that includes a front-end component. The front-end component can, for example, be a client computer having a graphical user interface, a Web browser through which a user can interact with an example implementation, and/or other graphical user interfaces for a transmitting device. The components of the system can be interconnected by any form or medium of digital data communication (e.g., a communication network). Examples of communication networks include a local area network (LAN), a wide area network (WAN), the Internet, wired networks, and/or wireless networks.

The system can include clients and servers. A client and a server are generally remote from each other and typically interact through a communication network. The relationship of client and server arises by virtue of computer programs running on the respective computers and having a client-server relationship to each other.

Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 network, 802.16 network, general packet radio service (GPRS) network, HiperLAN), and/or other packet-based networks. Circuit-based networks can include, for example, the public switched telephone network (PSTN), a private branch exchange (PBX), a wireless network (e.g., RAN, bluetooth, code-division multiple access (CDMA) network, time division multiple access (TDMA) network, global system for mobile communications (GSM) network), and/or other circuit-based networks.

The computing and processing systems can include, for example, a computer, a computer with a browser device, a telephone, an IP phone, a mobile device (e.g., cellular phone, personal digital assistant (PDA) device, laptop computer, electronic mail device), and/or other communication devices. The browser device includes, for example, a computer (e.g., desktop computer, laptop computer) with a world wide web browser (e.g., Microsoft® Internet Explorer® available from Microsoft Corporation, Mozilla® Firefox available from Mozilla Corporation). The mobile computing device includes, for example, a Blackberry®.

Comprise, include, and/or plural forms of each are open ended and include the listed parts and can include additional parts that are not listed. And/or is open ended and includes one or more of the listed parts and combinations of the listed parts.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

The invention claimed is:

1. A system for determining alignment of a first subsystem relative to a second subsystem, the system comprising:
   a first antenna system for simultaneously transmitting a delta pattern radiation beam at a first frequency and a sum pattern radiation beam at a second frequency;
   a second antenna system for receiving the delta pattern radiation beam at the first frequency and the sum pattern radiation beam at the second frequency; and
   a processor to process the received delta pattern radiation beam and sum pattern radiation beam to determine if a predetermined alignment criterion between the first antenna system and the second antenna system is satisfied.

2. The system of claim 1, wherein the first antenna system comprises a four arm helix antenna to transmit both the delta pattern radiation beam at the first frequency and the sum pattern radiation beam at the second frequency.

3. The system of claim 1, wherein the first antenna system is a multi-arm planar antenna system, conical spiral antenna system, multi-radial strip antenna system, multi-radial slot antenna system, slotted flat plate antenna system, or an array antenna.

4. The system of claim 1, wherein the sum pattern radiation beam peak is centered axially along a desired orientation axis of a first subsystem coupled to the first antenna system.

5. The system of claim 1, wherein the delta pattern radiation beam null is centered axially along a desired orientation axis of a first subsystem coupled to the first antenna system.

6. The system of claim 1, wherein the processor determines whether the predetermined alignment criterion is satisfied based on the amplitudes of the received delta pattern radiation beam at the first frequency and the sum pattern radiation beam at the second frequency.

7. The system of claim 1, wherein the first antenna system is coupled to a transmitting body and the second antenna system is coupled to a receiving body.

8. The system of claim 1, wherein the first antenna system transmits linearly polarized beams and the second antenna system receives linearly polarized beams, wherein the beams have the same polarization.

9. The system of claim 1, wherein the first antenna system transmits a circularly polarized beam and the second antenna system receives linearly or circularly polarized beams.

10. A method for determining alignment of a first subsystem relative to a second subsystem, the method comprising:
    simultaneously transmitting, with a first antenna system, a delta pattern radiation beam from a first antenna system at a first frequency and a sum pattern radiation beam at a second frequency;
    receiving, with a second antenna system, the delta pattern radiation beam at the first frequency and the sum pattern radiation beam at the second frequency; and
    processing the received delta pattern radiation beam and sum pattern radiation beam to determine if a predetermined alignment criterion between the first antenna system and the second antenna system is satisfied.

11. The method of claim 10, wherein the sum pattern radiation beam peak is centered axially along a desired orientation axis of a first subsystem coupled to the first antenna system.

12. The method of claim 10, wherein the delta pattern radiation beam null is centered axially along a desired orientation axis of a first subsystem coupled to the first antenna system.

13. The method of claim 10, wherein the second antenna system is an omni-directional or broad beam antenna oriented in the direction of the first antenna system.

14. The method of claim 10, comprising determining whether the predetermined alignment criterion is satisfied based on the relative amplitudes of the received delta pattern radiation beam at the first frequency and the sum pattern radiation beam at the second frequency.

15. The method of claim 14, wherein the predetermined alignment criterion is determined to be satisfied based if the amplitude of the received sum pattern radiation beam at the first frequency is determined to be greater than the amplitude of the delta pattern radiation beam at the second frequency by a predetermined threshold.

16. The method of claim 10, comprising:
    transmitting, from a transmitting body coupled to the first antenna system, the delta pattern radiation beam at the first frequency and the sum pattern radiation beam at the second frequency; and
    receiving, at the second antenna system coupled to a receiving body, the delta pattern radiation beam and the sum pattern radiation beam.

* * * * *